(12) United States Patent
Ward

(10) Patent No.: US 6,267,107 B1
(45) Date of Patent: Jul. 31, 2001

(54) SQUISHINDUCED TURBULENCE GENERATING COLLIDING FLOW COUPLED SPARK DISCHARGE IN AN IC ENGINE

(76) Inventor: Michael A. V. Ward, 32 Prentiss Rd., Arlington, MA (US) 02476

(*) Notice: Subject to any disclaimer, the term of this patent is extended or adjusted under 35 U.S.C. 154(b) by 0 days.

(21) Appl. No.: 09/496,146

(22) Filed: Feb. 1, 2000

(51) Int. Cl.$^7$ .................................................... F02B 23/08
(52) U.S. Cl. ........................ 123/661; 123/305; 123/636; 123/162
(58) Field of Search ................................... 123/301, 302, 123/305, 306, 162, 661, 637, 638, 634

(56) References Cited

U.S. PATENT DOCUMENTS

| | | | | |
|---|---|---|---|---|
| 5,211,147 | * | 5/1993 | Ward | 123/637 |
| 5,237,973 | * | 8/1993 | Oda | 123/662 |
| 5,261,367 | * | 11/1993 | Yamamoto et al. | 123/638 |
| 5,307,773 | * | 5/1994 | Suzuki | 123/661 |
| 5,727,520 | * | 3/1998 | Wirth et al. | 123/305 |
| 5,960,767 | * | 10/1999 | Akimoto et al. | 123/301 |
| 5,983,853 | * | 11/1999 | Roessler et al. | 123/305 |

* cited by examiner

*Primary Examiner*—Erick Solis
(74) *Attorney, Agent, or Firm*—Perkins, Smith & Cohen, LLP; Jerry Cohen

(57) ABSTRACT

An improved ignition-combustion system for internal combustion engines comprising a compact combustion chamber zone (4) in the engine cylinder head (6) mainly under the exhaust valve (8) and with large air-squish zones (124*a*, 124*b*) formed at the edge of the combustion zone which produce colliding squish flows (2, 2*a*, 3*a*, 3*b*) with high turbulence (3*c*) at the center of the combustion zone, with one or two spark plugs (12*a*/118, 12*b*/18*a*) located at the edge of the combustion zone within the high squish zones, resulting in a combined ignition and combustion system of colliding-flow-coupled-spark discharge (CFCSD), with the ignition employing high energy flow-resistant ignition sparks which move under the influence of the squish flow towards the central turbulence region as the piston nears engine top center, to produce rapid and complete burning of lean and high EGR mixtures for best engine efficiency and lowest emissions.

20 Claims, 7 Drawing Sheets

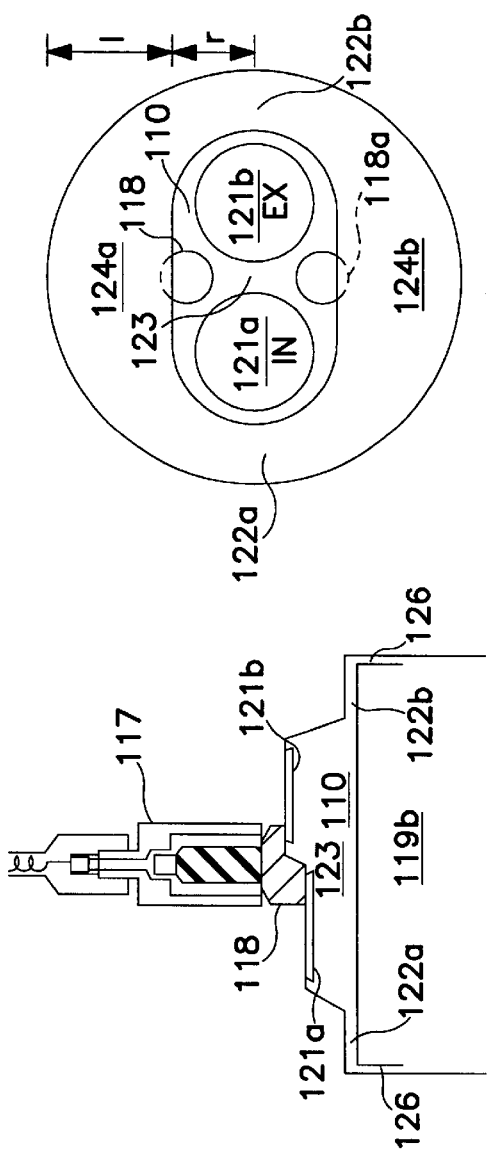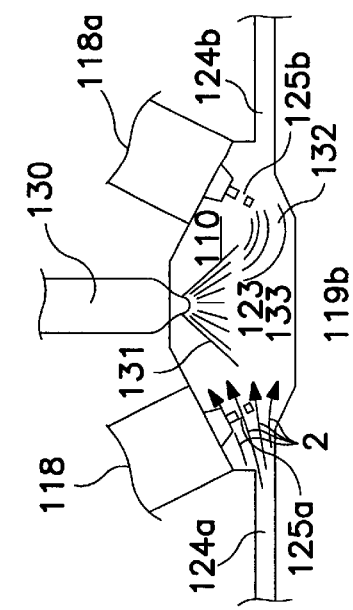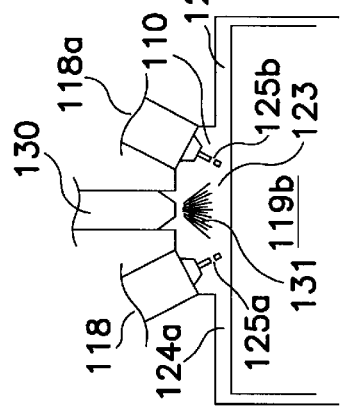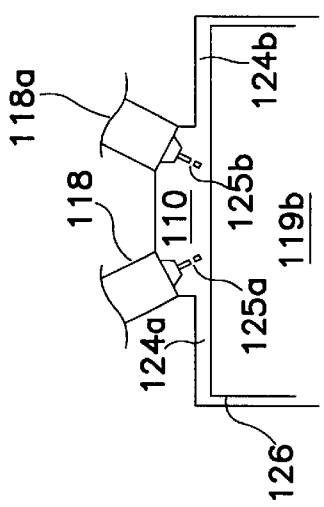

SQUISHINDUCED TURBULENCE GENERATING COLLIDING FLOW COUPLED SPARK DISCHARGE IN AN IC ENGINE

FIELD OF THE INVENTION

This invention relates to spark ignition internal combustion (IC) engines and to the improved ignition and combustion of air-fuel mixtures in IC engines through the faster and more vigorous combustion of the air-fuel mixture brought about by high air-flows of both the directed bulk flow type and of the more random turbulent flow type produced in a highly compact combustion zone of the combustion chamber. In particular, the invention relates to combustion systems which can simultaneously produce high directed bulk flow at the spark plug site at the time of ignition and more random and intense turbulent flow inside a compact combustion chamber during the time of ignition and combustion to speed-up the burn. In particularly, the invention relates to a system which involves the design and control of high flows, high energy ignition spark discharges, and resulting intense flame kernels, all three of which interact among themselves in ways that produce a very rapid and controlled burn in a compact combustion zone for low NOx emissions and high engine efficiency through lean and high EGR (exhaust gas recirculation) combustion at a high engine expansion ratio.

BACKGROUND OF THE INVENTION AND PRIOR ART

High flows are used in IC engines to improve engine efficiency and emissions through rapid combustion of lean and high EGR air-fuel mixtures. These flows are either swirl, tumble (vertical vortex), or squish. The predominant type of flow used is swirl, especially for the purpose of generating mixture stratification at the spark plug site to allow for ignition of lean mixtures. Numerous examples of these exist, especially with Japanese manufacturers such as Toyota, Mazda, and others. To a lesser extent tumble flow is used, as in the Mitsubishi Vertical Vortex (MVV) engine now in production. Squish is rarely used for efficiency and emissions improvement. It is used principally in racing and performance for speeding up the combustion of high speed engines. Moreover, such squish flow is not used in conjunction with the spark except in my U.S. Pat. No. 5,517,961, where it is used in conjunction with a high energy, flow-resistant spark to help spread the spark and speed up the burn.

SUMMARY OF THE INVENTION

In this patent application is disclosed an ignition and combustion system based on the interaction of two types of flows typically occurring orthogonally or at other angles to each other. One is a bulk flow located at the spark plug site at the time of ignition to interact (couple) to the spark discharge to direct and spread the spark, along arc runners if practical; the other is made up of impinging flows, which are directed towards each other as colliding flows which generate intense turbulence upon colliding, into which the spark discharges and resulting initial flame kernels can move in the form of flow-coupled-spark-discharges of the type disclosed in my U.S. Pat. No. 5,517,961. Preferably the colliding flows occur in a highly confined region or zone of the engine combustion chamber defined by the piston or other movable element nearing top center (TC) and the fixed walls of the combustion volume, made up, for example, of the engine cylinder wall and cyinderhead in a conventional piston IC engine. Preferably, the colliding flows occur in a combustion zone under the exhaust valve, or other high temperature zone of the combustion chamber, with the bulk flow occurring at one, two, or more individual or continuous edges of the turbulent zone to move and direct one, two, or more high energy flow-resistant spark discharges into the mixture turbulence to produce a very rapid and complete combustion of an air-fuel mixture without engine knock or other deleterious effect. In this way, very lean and high EGR mixtures can be burnt very rapidly at a high compression ratio without knock to produce high engine efficiencies and low emissions, especially low NOx emissions whose formation depends on both temperature and time, both of which are minimized in this application.

Preferably, but not necessarily, both flows, the bulk flow, BF, and colliding turbulence generating flows (CTF) are produced by the piston motion near TC, with the bulk flow occurring at the spark plug site and directed towards the region of the turbulence of the CTF. With the use of one spark plug and two valves, preferably the spark plug is located between the valves disposed preferably along or near a center diameter line of the engine cylinder. The spark plug may be located along a center line if bulk flow is present at the spark plug site, e.g. by placing the combustion chamber under the exhaust valve; or the spark plug may be placed offset of the valve center line at a high squish bulk flow region if the combustion chamber includes part or most of the region under both valves, either in the cylinder head or in the piston as has been disclosed in my U.S. Pat. No. 5,517,961. If two spark plugs are used, with one or two intake and one exhaust valve, more options are available for achieving BF and CTF. For example, the spark plugs can be disposed on either side of the exhaust valve under which is defined the combustion chamber and region of CTF, with two inward moving bulk flows (BFs) occurring at the two spark plug sites for two flow-coupled-spark discharges (FCSD), producing a more elongated combustion zone and even more rapid burning of the air-fuel mixture. Placing the combustion chamber under the exhaust valve reduces the engine's knock susceptibility and improves its lean burn capability.

In general, for conventional piston engines, the flows are produced by the piston motion near TC which induces extended squish flows which can be viewed as pairs of flows induced to move towards each other and collide to produce an elongated intense turbulence in the combustion zone, and one or more highly directed bulk flows which are directed to pass through the spark gap or other ignition region to form a flow-coupled-spark discharge (FCSD) which moves into, and feeds, the colliding turbulent flows to produce a very rapid and vigorous burn. This can be viewed as a colliding-flow-coupled-spark-discharge (CFCSD), versus simply an FCSD. It is made up of high energy, flow-resistant, flow-coupled-spark-discharges which move into, and/or produce initial flame kernels which move into, the high turbulence region (of small eddies) produced by colliding flows which homogenize the mixture and help spread the flame. In effect, CFCSD is a turbulent air-fuel mixture into which high energy spark discharges and/or flame kernels penetrate at a high directed speed spread under intense turbulence.

A preferred embodiment is one in which two valves are used with the spark plug in between the valves in a line approximately representing a diameter of the cylinder, with the combustion zone under the exhaust valve which is recessed and with the intake valve only slightly recessed so as to provide a region of high squish at the spark plug site.

Intake valve opening preferably occurs at or very near TC, before or after TC, so as to require minimum intake valve recessing to not unduly compromise the squish flow at the spark plug site. Preferably the piston is flat or slightly cupped under the combustion zone, with thermal barrier coatings used to limit heat transfer to the piston and other parts of the combustion chamber.

In another preferred embodiment, the inlet air flow is used to reinforce the combustion process. Such an inlet flow can be a vertical vortex flow which reinforces one or more of the squish induced flows.

For the ignition, preferably triangular distribution spark with a peak amplitude above 200 milliamps (ma) is used, say 300 to 800 ma, operating in part in the flow-resistant arc discharge mode (versus glow discharge) which can sustain flow velocities of 20 meters/sec (m/s) or greater without spark segmentation, as disclosed in my U.S. Pat. No. 5,517,961, to produce a very fast ignition and combustion of the mixture.

In another preferred embodiment, the spark may be fired to the piston given the ability to operate the engine with ignition near top center, between 5° and 30° before top center (BTC), with special electrode tips acting as arc runners which improve coupling of the spark to the flowing mixture. Special design halo-disc spark plugs of my U.S. Pat. No. 5,577,471 can be used, or similar plugs with large thin discs at their ends to define a runner along which the spark can move under the influence of the flow.

In another preferred embodiment, the valve timing is selected to make best use of CFCSD. This includes setting the intake valve opening preferably at TC (or a few degrees before or after TC) for the cases with no combustion volume under the intake valve. The exhaust valve closing is preferably set before TC (BTC), eg. 10° to 30° BTC (or well after TC where the last part of the exhaust is pulled back into the combustion chamber) to trap the last part of the exhaust for both high internal exhaust gas residual fraction to eliminate or minimize the need for EGR as well as minimize hydrocarbon (HC) emissions since the last part of the burnt mixture to be exhausted contains proportionally more unburn tHC. Having the combustion chamber under the exhaust valve can help the process of trapping the (last) part of the exhaust coming from the ring clearances and other chamber crevices which have the most unburn tHC emissions, to be burnt in the subsequent ignition and combustion firing cycle.

In another preferred embodiment using preferably a high energy, high efficiency, flow resistant ignition spark, an improved combustion chamber of the squish type is used which has the combustion chamber in the cylinder head under both the intake and exhaust valves which are centrally located and made as small as practical to allow for large squish flows, especially in a direction transverse to the line joining the two valves, with one or two spark plugs located in the squish zone. Preferably, the intake valve is recessed so that in its fully open condition it clears the top of the piston when positioned at top center (TC), and likewise for the exhaust valve which is preferably even further recessed. This represents a free-wheeling system which will not damage the engine should the timing belt break (in the preferred overhead cam configuration). In such a design several advantages result, including thorough mixing of the air-fuel mixture due to the squish induced colliding flows, rapid burning of the air-fuel mixture, especially of high dilution, high exhaust gas recirculation (EGR) and high air-fuel ratio (AFR) mixtures which produce high efficiency and low emissions, and high internally retained exhaust gas, especially that located at the further regions of the combustion chamber, e.g in the ring crevices where most of the unburnt hydrocarbons are formed which can be reburnt in the subsequent ignition firing cycle.

More ideally, the disclosed ignition/combustion/flow systems are used in a Miller Cycle engine or variable-valve-timing engine with high expansion ratios of approximately 12 to one or higher and delayed intake valve closing (for effective lower compression ratio). If practical, the systems disclosed are used in the virtual 3-stroke engine disclosed in my U.S. Pat. No. 5,454,352 where in FIG. 7 of that patent is shown a preferred embodiment of the virtual 3-stroke engine in the form of an opposed piston with two valves and two spark plugs. Preferably, the valves are smaller which is more practical with the use of a turbo charger to create a more compact combustion chamber in the cylinder head and higher squish at the spark plug sites. The compressive friction makes this engine easy to start and ideal for the forthcoming dual rail 14/42 volt battery systems with integrated starter/generator (ISG). It also makes it very efficient and of very low emissions. NOx emissions are low due to the low adiabatic heating of the intake air on compression and low overall temperatures due to the long expansion stroke (preferably of 12 to one or higher expansion ratio). Because of the inherently high efficiency (BSFC, or brake specific fuel consumption), especially at part load, combustion can be somewhat delayed, as in the diesel engine, to limit peak combustion temperatures below the level where significant NOx emissions are formed. This engine can be operated either premixed, i.e. indirect injection or carbureted, or direct in-cylinder injection, either moderate pressure injection as in the GDI engine, or higher pressure injection as in the diesel engine.

Other means for producing CFCSD are possible, including in other types of engines, such as two-stroke, rotary, gas direct injection, and others, the main inventive principle disclosed herein being the combination and interaction of flow-coupled-spark-discharge with turbulence generating colliding flows, especially in a compact and hotter region of the combustion chamber of a spark ignition engine.

BRIEF DESCRIPTION OF THE DRAWINGS

FIGS. 11, 11a, 11b, 11c and 11d are partial side views and atop view of a combustion chamber with one small intake and exhaust valve centrally located and with the compact combustion zone under the two valves, and with two spark plugs located at two opposite sides of the combustion zone in regions of high squish flow, and a central fuel injector shown as an option in FIGS. 11c and 11d.

DESCRIPTION OF PREFERRED EMBODIMENTS

Figure 1A:
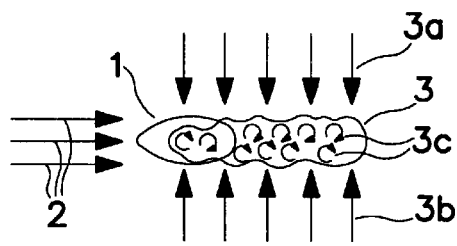
FIGS. 1a and 1b are drawings of air-flow vectors and flow interactions in a compact engine combustion chamber (combustion zone) that characterize a key feature of the invention.
Figure 1B:
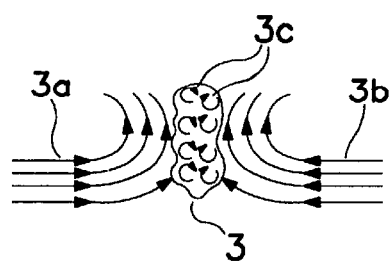

FIGS. 1a and 1b are drawings depicting, in schematic form, flow vectors and flow interactions that lead to the principles of this invention Region 1 denotes the region of the ignition source which can be the gap between spark plug electrodes and the region adjacent to the electrodes into which the spark discharge moves by the action of the air-flow indicated by flow vectors 2, representing bulk flow, BF, to produce what has been described as a flow-coupled-spark-discharge, FCSD. Region 3, shown with small partially circular curves with arrows 3c, indicating tiny turbulent eddies, is the region of high turbulence generated by the approximately equal and oppositely directed colliding flows 3a and 3b, producing what has been designated as CT. The spark discharge region 1 preferably penetrates the turbulence region 3 at approximately right angles to the direction of the colliding flow vectors 3a and 3b, as shown. A second ignition source region can be equally well placed at the right side of the turbulence region 3, as is indicated with reference to FIGS. 2a, 2b, and other figures.

Figure 2A:
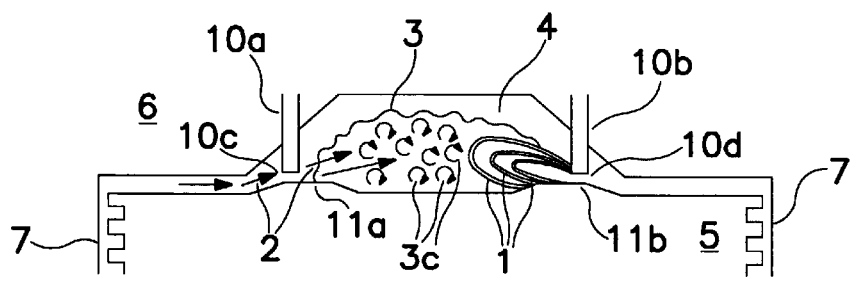
FIGS. 2a and 2b are approximately to-scale drawings of the side and top view of a combustion chamber with a preferred embodiment of the invention with central combustion zone under a central exhaust valve, and two intake valves and spark plugs located in the squish zones.
Figure 2B:
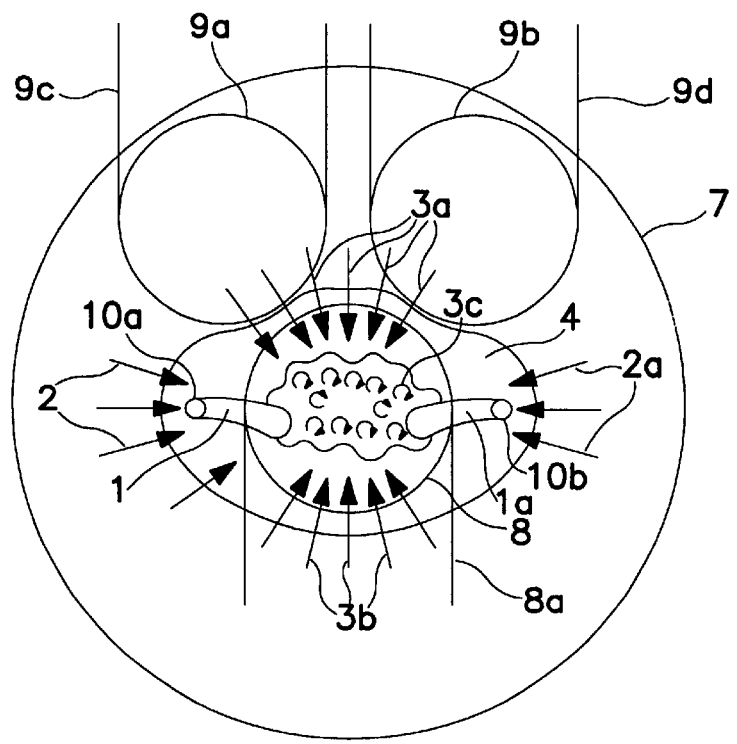

FIGS. 2a and 2b depict in partially schematic, approximately to-scale drawings, side and top views of a combustion zone 4 of a conventional piston engine contained within a larger combustion chamber volume defined by a piston 5, cylinder head 6, and cylinder sleeve 7. The term "combustion zone" 4 shall be used to indicate the region where the major and first part of the combustion, or burning, occurs as distinguished from "combustion chamber" which indicates the entire volume as already defined. In this preferred embodiment, the combustion zone 4 is shown located in a central part of the combustion chamber under an approximately centrally located exhaust valve 8 with exhaust tube 8a, with two intake valves 9a, 9b shown at one side of the combustion chamber with intake tubes 9c and 9d (allowing for the more central exhaust valve 8 and combustion zone 4 under the exhaust valve 8). In this preferred embodiment is shown two high voltage spark plug electrodes 10a and 10b disposed symmetrically at opposite ends of the elongated combustion zone 4 with ground electrodes 11a and 11b defined by small rises on the piston for producing spark discharges between the tips 10c and 10d of electrodes 10a and 10b and the piston surface regions 11a and 11b, i.e. ignition firing to the piston versus to conventional "J" ground electrodes. Spark firing tips 10c, 10d, 11a, and 11b are made of erosion resistant material.

For ease of visualization in FIG. 2a are shown, around the gap of the left-most electrodes 10c/11a, bulk flow vectors 2, and around the right-most electrodes 10d/11b spark discharges 1 being directed by the bulk flow vectors into the turbulence region 3, understanding that both the bulk flow (2 and 2a of FIG. 2b) and spark discharges (1 and 1a of FIG. 2b) are present around both spark gaps. In this preferred embodiment, a central combustion zone is provided with high bulk flow at the plug sites and high turbulence inside the combustion zone. When used with a high energy ignition system with flow resistant sparks (direct current arc discharge mode) of long duration, i.e. of order of magnitude one millisecond, one can achieve a very rapid burn of a dilute air-fuel mixture, diluted with excess air (lean mixture) and/or with retained exhaust gas (high exhaust residual or EGR), for very high efficiency and low emissions. Preferably, a high and optimum compression ratio (CR) is used, e.g. between 10:1 CR and 15:1 CR, for best efficiency, which depends on several factors including fuel type used and heat transfer to the combustion chamber surfaces which increases with compression ratio (and can be reduced with thermal barrier coatings). More ideally, a Miller type cycle is used with late intake valve closing of 60° after bottom center (ABC) or greater, and a high expansion ratio (ER) of 12 to one or higher.

Figure 3:
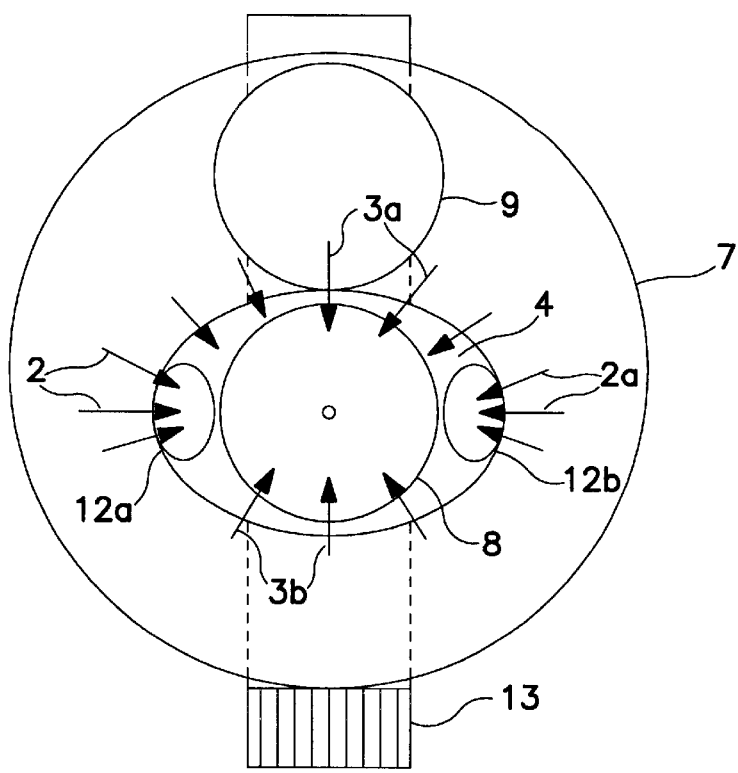
FIG. 3 is a top view similar to that of FIG. 2b but with one intake valve.
Figure 5:
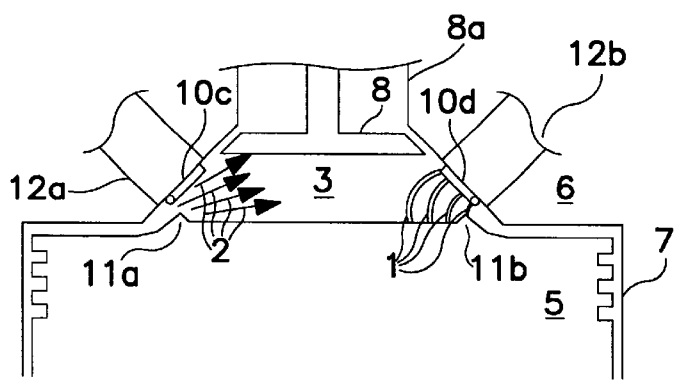
FIG. 5 is an approximately to-scale side view drawing through a line intersecting the two spark plugs of FIGS. 2b and 3.

FIG. 3 is an approximately to-scale, partially schematic top view of a spark ignition piston engine representing a preferred embodiment of CFCSD of the type of FIGS. 2a and 2b except that it has one intake valve 9 instead of two. Like numerals represent like parts with respect to the earlier figures. In this preferred embodiment, the spark plugs 12a and 12b are shown (instead of the electrodes), understanding that the spark plugs can be located at an angle to the vertical as is depicted in FIG. 5, versus vertical as shown in FIGS. 2a, 2b. This design is especially useful for use with a centrally located single overhead cam 13, as depicted, with the two spark plugs located with an angle to the vertical to help clear the cam as well as to better position their tips in the combustion chamber. Another embodiment is to have two smaller intake valves, one at the present location and the other at the opposite side, 180 degrees away.

Figure 4A:
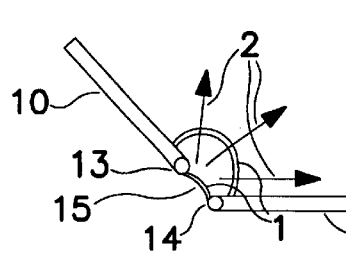
FIGS. 4a to 4c show various arc runners for the spark to move along under the action of bulk flow, such as squish flow.
Figure 4B:
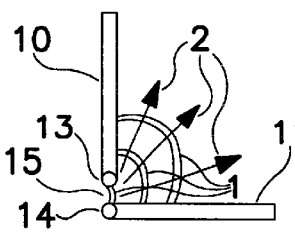
Figure 4C:
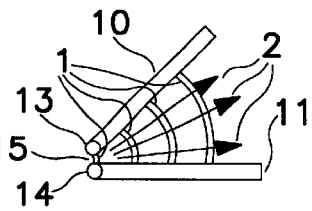

For better coupling of the spark discharge to the flow, an electrode geometry that acts in part as an arc runner may be practical. FIGS. 4a to 4c show a pair of electrodes 10 and 11 with firing tips 13 and 14, the electrodes subtending progressively smaller included angles from FIG. 4a to 4c. Flow vectors 2 are shown emanating from the spark gaps 15 as are spark discharges 1 which move along the runners 10/11. It can be appreciated that the smaller the included angle between the electrodes, say from 30° to 90°, the more directed is the flow and the less stretching there is of the spark discharge as it moves along the runners 10/11 per unit motion, making FIG. 4c the more preferred embodiment for electrode geometry which can produce greater motion of the spark discharges 1 and hence greater penetration of the spark into the turbulence region 3. FIG. 5 shows an embodiment of the spark plug electrodes of FIGS. 2b and 3 to produce better spark penetration and size.

FIG. 5 is a partially schematic, approximately to-scale side view drawing through a line intersecting the two spark plugs of FIGS. 2b and 3, representing a preferred embodiment of CFCSD. Like numerals represent like parts with respect to the earlier figures. In this embodiment are shown spark plugs 12a and 12b, preferably 18 mm, with large diameter, thin, erosion resistant electrodes 10c, 10d disposed at right angles to the plug axis forming a small included angle (approximately 45°) with the piston top (shown close to TC) to produce a preferred arc runner of FIG. 4c (versus FIG. 2a which represents arc runners of FIG. 4b). As in FIG. 2a, the flow vectors 2 are shown on the left and the spark discharges 1 on the right for ease of visualization, both moving into the turbulence region 3. The spark gaps 15 are made with small rises 11a and 11b on the piston surface, which represents the second arc runner combination 11 of FIGS. 4a to 4c. Systems involving firing to the piston have been disclosed in several of my prior patents, including U.S. Pat. Nos. 4,774,914 and 4,841,925 among others. Also, many electrode types have been disclosed, two of several possible types being depicted in FIGS. 6a and 6b.

Figure 6A:
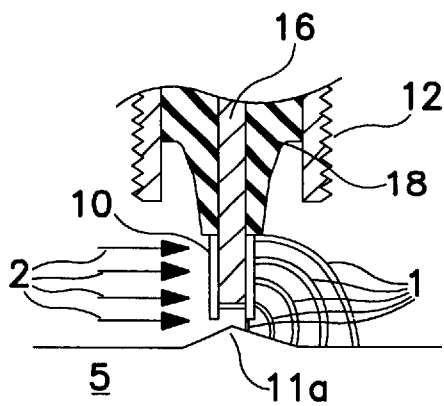
FIGS. 6a and 6b are two types of spark plug firing ends for ignition firing to the piston.
Figure 6B:
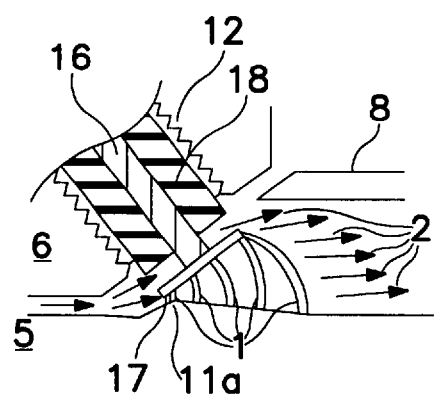

FIGS. 6a and 6b are approximately to-scale, partial side view drawings of two spark plug ends firing to the piston 5. Like numerals represent like parts with respect to the earlier figures. In FIG. 6a the center conductor 16 is preferably copper extending axially into the combustion chamber near the piston surface at the TC point with a coating 10 (representing the arc runer) of erosion resistant material, such as tungsten-nickel-iron. The runner geometry conforms to that of FIG. 4b (90° included angle). In FIG. 6b the arc runner is erosion resistant disc 17 at right angles to the plug axis shown located slightly away from the end surface of insulator 18 (versus on the surface of the insulator, as in FIG. 5). These piston firing embodiments produce better spark penetration towards the center of the combustion zone.

Figure 7:
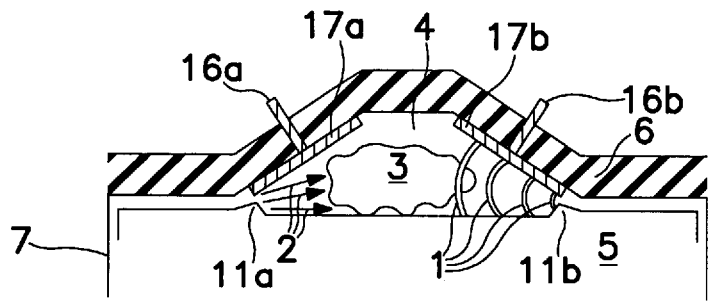
FIG. 7 is a more idealized embodiment of FIG. 5 with special spark plugs located on an electrically insulating cylinder head, achievable in a two stroke engine or other engine where valves are absent from the cylinder head or highly confined in the head.

FIG. 7 is a more idealized embodiment of FIG. 5 which can be attained in a two-stroke engine where valves are absent from the cylinder head or rotary type valves are used (with a four stroke engine also). The engine cylinder is a partially schematic, approximately to-scale side-view drawing representing another preferred embodiment of CFCSD. Like numerals represent like parts with respect to the earlier figures. In this preferred embodiment, the cylinder head is shown made of insulating thermal barrier material (as in an adiabatic engine), with a central triangular cross-section combustion zone 4, on the two angled surfaces of which are placed large, flat, thin electrodes 17a, 17b connected to high voltage terminal 16a and 16b respectively. In this embodiment, extremely effective and large arc runners between 17a and 17b and the piston surface are achievable for extensive penetration of the arc discharge into the turbulence region 3 of the combustion zone 4. However, to accomplish this a high energy ignition with long duration flow-resistant sparks of the types I have disclosed elsewhere is preferred. Also, special treatment of the piston surface is required, e.g. such as coating with erosion resistant material which can also be a relatively poor thermal conductor.

Figure 8:
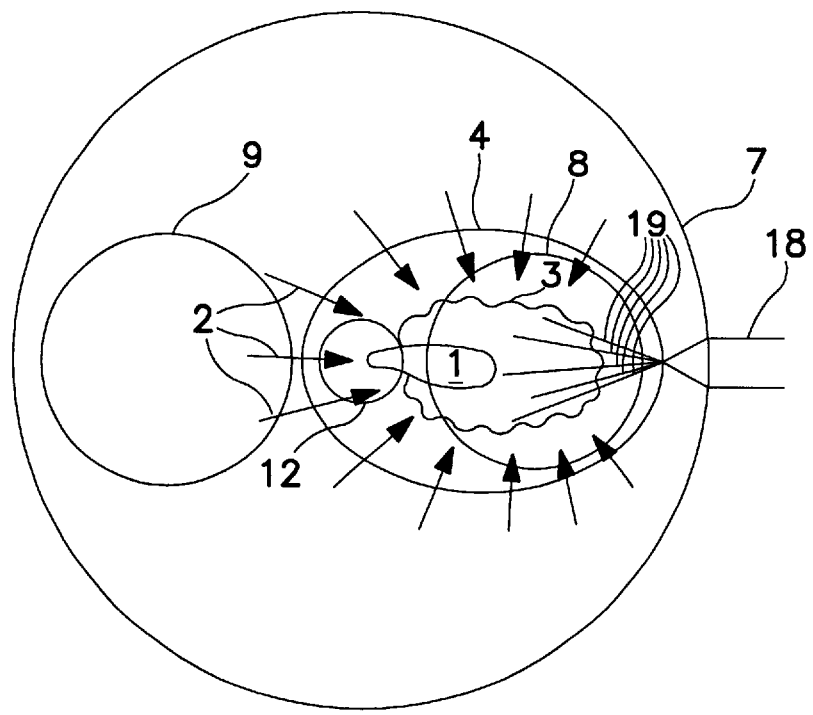
FIG. 8 is a preferred embodiment of a direct injection version of the invention with the fuel injector located at the edge of a combustion zone under the exhaust valve across from a single spark plug in the squish zone.

In many applications arc runners are not practical, so more conventional spark gaps with proper oriented electrodes may be used (that do not interfere with the flow), or circularly symmetric spark gaps may be used. In such a case, the high energy-flow coupled-spark-discharge (FCSD) acts as a stationary extended spark (a plume) through which the mixture flows under the action of bulk flow to produce flame kernels which move and grow as they enter the turbulence region 3 of the combustion zone 4. FIG. 8 depicts such an embodiment.

In FIG. 8 is shown a partially schematic, approximately to-scale top view of a piston IC engine representing a preferred embodiment of CFCSD with a single spark plug 12 and single intake valve 9, with the valves and spark plug placed collinear in an approximately central cylinder 7 diameter line with the spark plug in the center between the valves. Like numerals represent like parts with respect to the earlier figures. In this embodiment, the combustion zone 4 is located mainly under the exhaust valve with small piston clearance for the intake valve to allow for squish bulk flow 2 at the spark plug site. The use of a rotary intake valve would obviate any concern associated with the preferred small clearances between the valve and piston.

Shown also in the figure is a fuel injector nozzle 18 preferentially located across from the spark plug, representing a gas-direct-injection (GDI) version of the present invention allowing for the use of various fuels. The injector injects the fuel spray 19 into the turbulence region where it becomes rapidly mixed and homogenized for clean burning and prevention of spark plug fouling (a problem with spark ignition diesels).

Figure 8A:
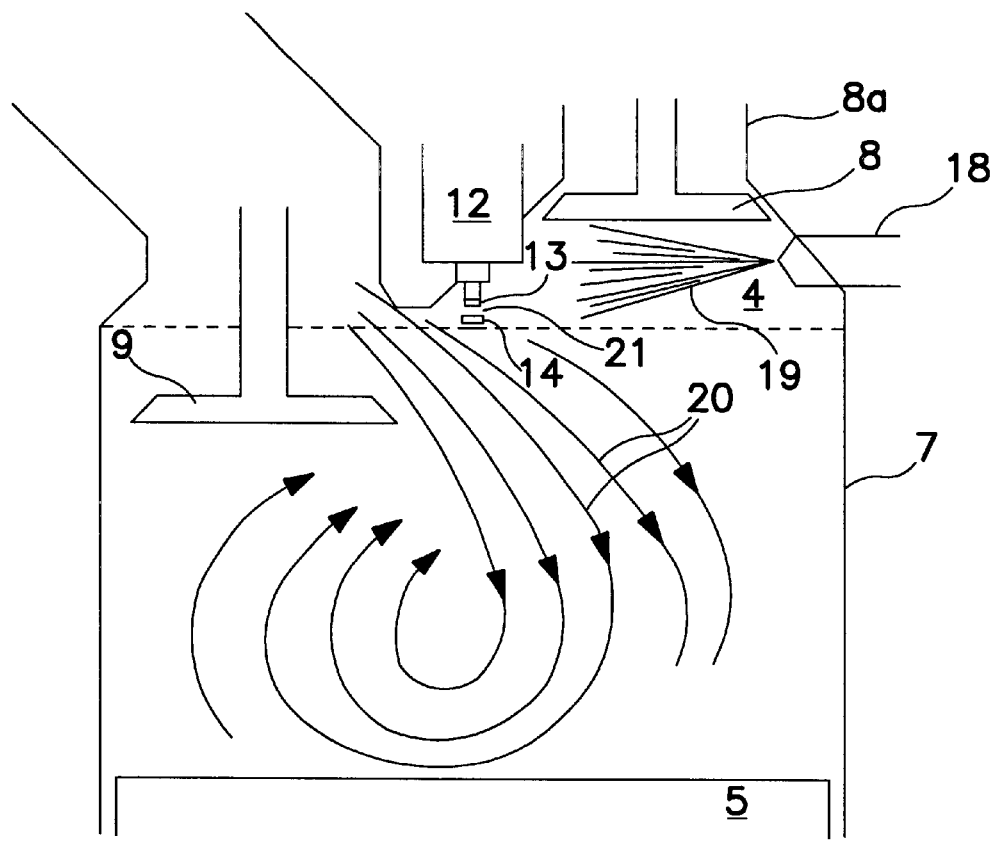
FIG. 8a is a possible side view of the embodiment of FIG. 8 during the intake process.
Figure 8B:
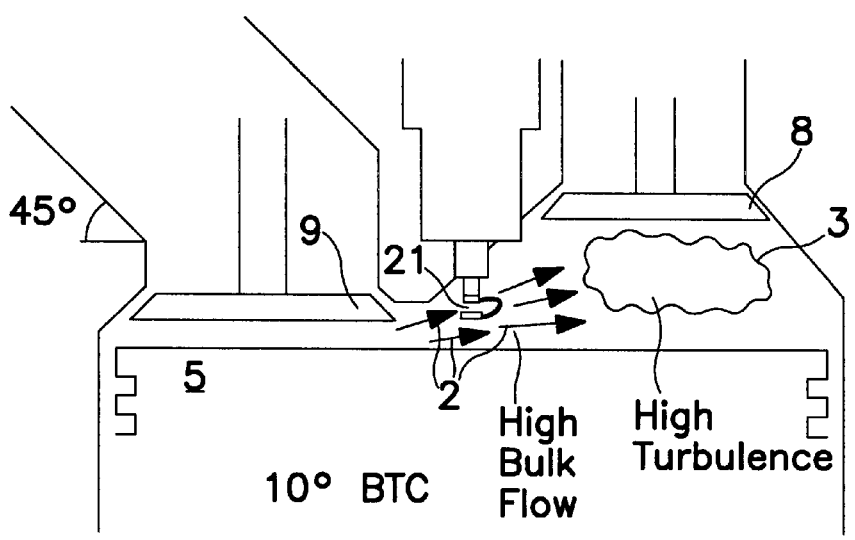
FIG. 8b is a view of FIG. 8 without the fuel injector, with the piston near top center.

A partially schematic, side view, approximately to-scale drawing of a cylinder of the engine of FIG. 8 with the piston near the end of the intake stroke is shown in FIG. 8a. The intake air 20 is shown entering in a vertical circular form representative of tumble flow which can reinforce the flow 2 at the spark gap 21 of FIG. 8b, which represents the engine of FIG. 8a with the piston at the end of the compression stroke near TC. Like numerals for both FIGS. 8a and 8b represent like parts with respect to the earlier figures. In FIG. 8a is shown the alternative possible fuel nozzle 18 (not shown in FIG. 8b representing the more conventional engine).

Figure 9A:
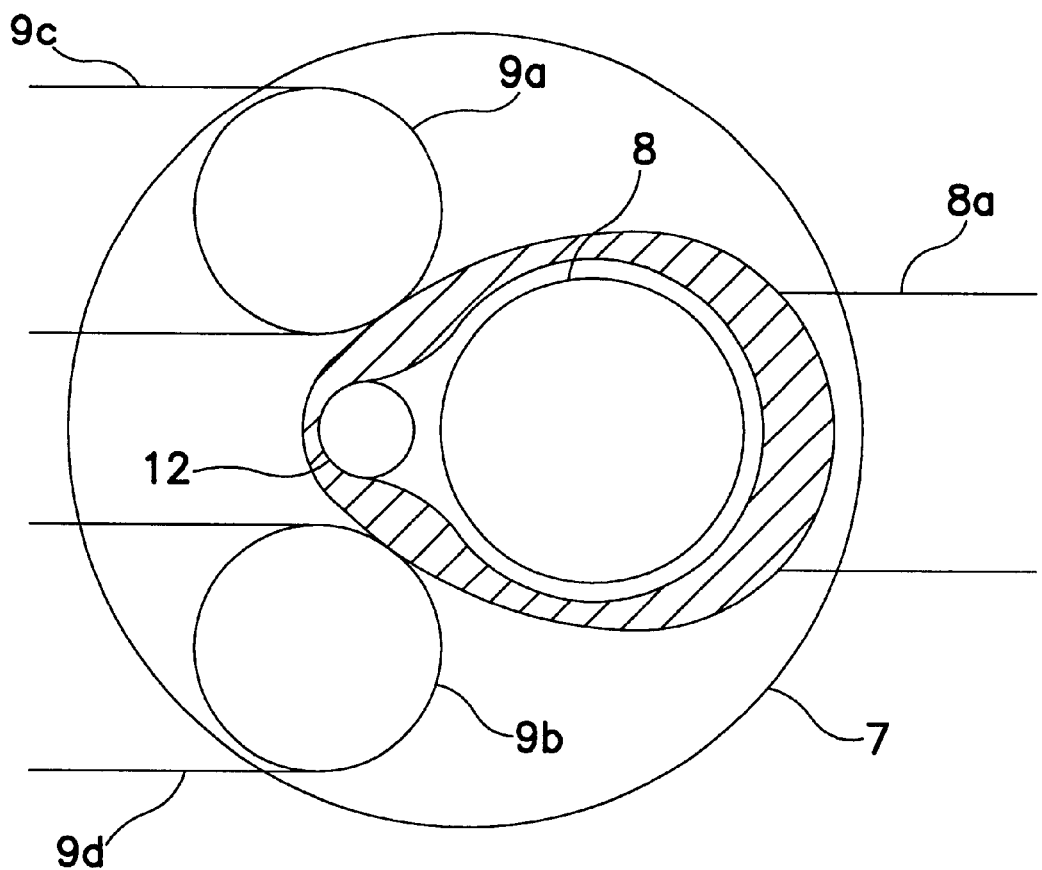
FIGS. 9a and 9b is a top and side view drawing of a combustion chamber with two intake valves and one exhaust valve with the combustion zone under the exhaust valve and a single spark plug located at a more central point at the edge of the combustion zone.

FIG. 9a shows a partially schematic, approximately to-scale top view of a piston IC engine representing a preferred embodiment of CFCSD with a single spark plug 12 and two intake valves 9a and 9b, with the exhaust valve 8 and spark plug 12 placed collinear in an approximately central cylinder 7 diameter line. Like numerals represent like parts with respect to the earlier figures. The shaded portion shown indicates the sloping region of the combustion zone from its peak just under the exhaust valve 8.

Figure 9B:
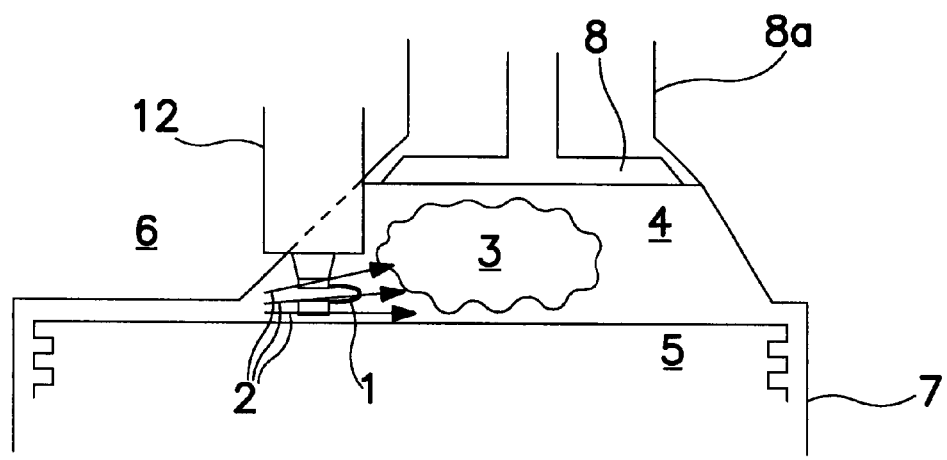

FIG. 9b is a partially schematic side-view drawing of the engine cylinder of FIG. 9a, with like numerals representing like parts with respect to the earlier figures. As in most of the drawings, the piston is shown near TC in the compression ignition firing stage. In this embodiment, the combustion chamber zone 4 is under the exhaust valve 8 and the spark gap is in a high squish zone as required.

Figure 10A:
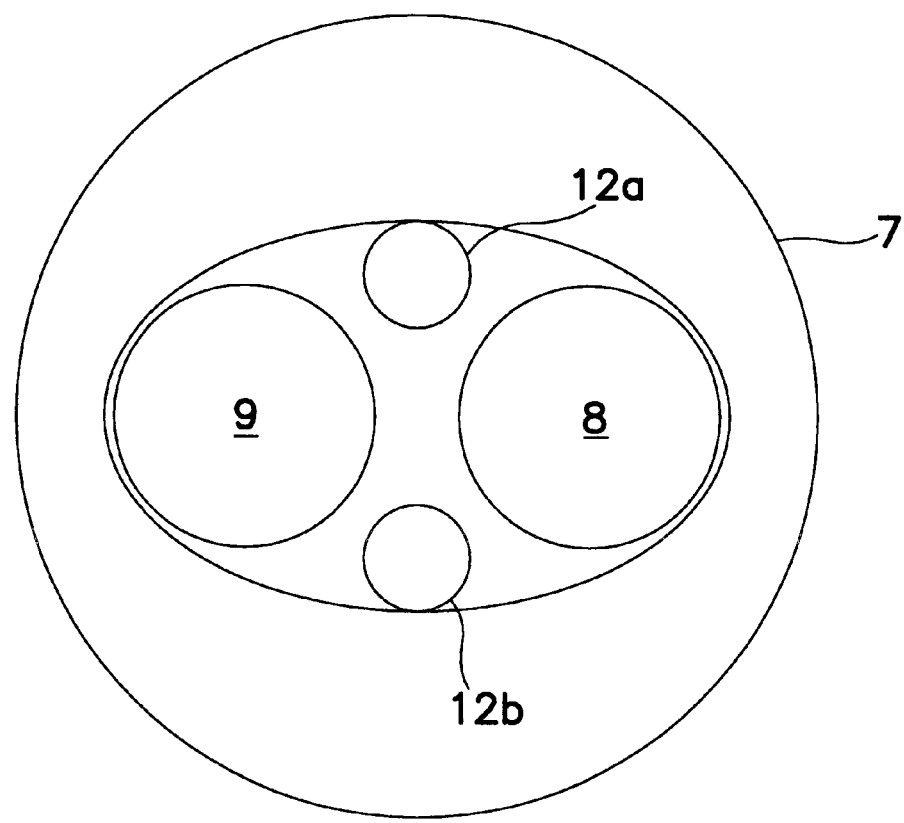
FIGS. 10a and 10b is a more conventional pent-roof chamber with combustion zone both in the head and piston under the single intake and exhaust valves and two spark plugs at the edge of the combustion zone in the squish zones.
Figure 10B:
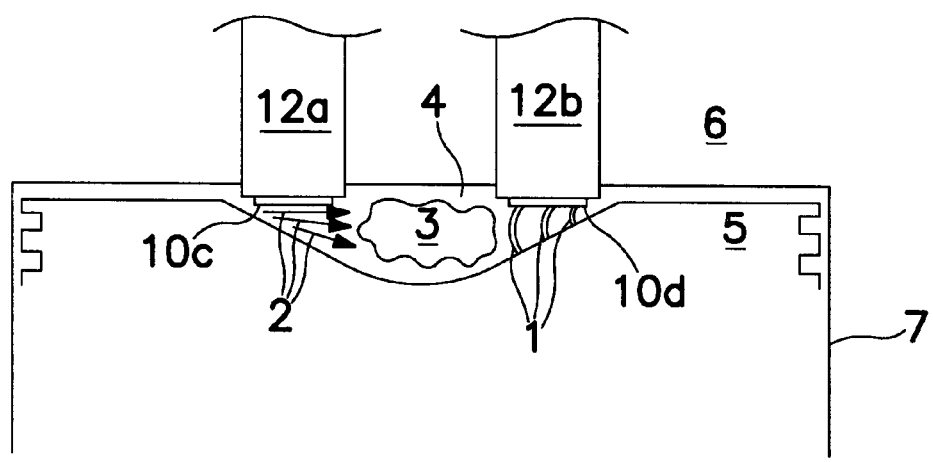

FIG. 10a and 10b indicates the combustion chamber of a more conventional type pent-roof engine with the combustion zone shared between the cylinder head 6 and the piston 5, but mostly in the piston. Two spark plugs 12a and 12b are shown as one of several options (one spark plug being the more conventional option). The spark plug tips may be more conventional or similar to those of FIGS. 5 and 6b which can act as arc runners as already discussed. Like numerals represent like parts with respect to the earlier figures.

An interesting and relevant variation of the combustion chamber of FIGS. 10a and 10b is that of Jim Feuling most recently reported in the February 1999 issue of Hot Rod magazine in an article entitled "Lean, Mean, and Clean, Part One". The combustion chamber is a FIG. 8 combustion chamber in the cylinder head under the intake and exhaust valves with the spark plug in the middle. This design creates high turbulence in the combustion chamber except that the volume is larger (combustion zone is under both valves). Moreover, since the spark plug is in the middle and not at the edges of the combustion zone, as in FIGS. 10a and 10b, and does not use a high energy, flow resistant spark, it is not subject to bulk flow, as is disclosed in the present invention, to spread the spark discharge and create a rapid initial burn.

In the preferred embodiments of this invention, the ignition and combustion stage is so fast that ignition can occur near TC, even for dilute mixtures (which permits piston firing as one alternative for generating and locating the spark, although it is not required). Preferably, ignition occurs as close to 10° BTC as practical since the inward directed squish flow (bulk flow) is at its maximum near that ignition timing. Under such conditions, the very powerful and rapid ignition and burn means that highly dilute mixtures can be burnt effectively for low exhaust emissions and high fuel economy. Preferably mixture dilution is produced internally (versus EGR) by valve timing, i.e. by advancing the exhaust valve closure, although it may be supplemented with EGR and with excess air (lean mixtures). The very fast burn of dilute mixtures results in very low NOx emissions due to both the faster burn (less time for NOx to form) and lower peak combustion temperatures, while the higher trapped exhaust results in lower HC emissions. Also the bulk flow and colliding flow turbulence generation produces very good air-fuel mixing for a more homogeneous mixture for lower HC emissions and higher engine efficiency. Rapid burn also allows for higher compression ratio and higher engine efficiency.

FIGS. 11, 11a, 11b, 11c and 11d depict various partial views of an engine combustion chamber in which the compact combustion zone 110 is contained in the cylinder head under both the intake and exhaust valve of preferably small size and with two spark plugs in the combustion chamber located in the region of high flow. FIG. 11 depicts a top part of a spark plug 118 with a preferred capacitive spark plug boot 117, which may also be built into the spark plug to provide a typical capacitance of 30 to 60 picofarads.

The combustion chamber zone 110 disclosed has preferably intake valve 121a and exhaust valve 121b disposed parallel to the flat top of the piston 119b and are made as small as practical to provide squish zones 122a and 122b at the far edges as shown. The valves are located in line as close as is practical to each other, as shown in the top view of FIG. 11a, where like numerals represent like parts with respect to FIG. 11. The combustion chamber zone 110 is in the head in an elongated region defined by a volume under each valve and open in the central region 123 between the two valves. Preferably, the larger volume is under the exhaust valve 121b, which is more recessed than the intake valve 121a, which is preferably recessed to just to miss the piston at its TC position when the intake valve is fully open (which can occur if the timing belt breaks for an overhead cam engine design).

With further reference to FIG. 11a, the design shown provides large squish areas 124a and 124b, as is also shown in FIGS. 11b, 11c, 11d which are side-views disposed 90° from that of FIG. 11. In FIGS. 11b, 11c, 11d like numerals represent like parts with respect to FIG. 11. In both FIGS. 11a, 11b, 11c, 11d are shown the possibility for inclusion of two, instead of just one, symmetrically placed spark plugs 118 and 118a, making preferably about 30° with the vertical and placed at the inner edge of the large squish zones 124a and 124b so that the spark gaps 125a and 125b are subjected to high squish flow near TC during ignition. In a preferred design, the squish lands 124a and 124b have a transverse length "l" approximately equal to or greater than the transverse radial dimension "r" of the compact combustion chamber, as is shown to produce high squish at the spark plug site and high colliding flows in the compact combustion chamber zone 110. This helps vaporize, by the radial intense flow prior to TC, any fuel that may have collected on the piston lands, and produces rapid mixing of the air-fuel mixture in the combustion chamber zone 110 due to the turbulent colliding flows, even at low speeds where combustion is normally poor. The piston to head clearance in the land areas 122a, 122b, 124a, 124b is typically 0.04" to 0.1" to create adequate squish without undue heat losses for a typical engine with a bore and stroke in the 3" to 4" range. The clearance is scaled appropriately for larger engines. The engine cylinder views of FIGS. 11, 11a, 11b, 11c are approximately ⅔ of full scale of a typical IC engine cylinder. In FIGS. 11c and 11d, where FIG. 11d is an exploded view of the central part of FIG. 11c, are shown a centrally located fuel injector 130, operable at moderate pressure as in a GDI engine, or at high pressure as in a diesel engine, located between the two valves and spark plugs with central fuel spray cone 131 covering the central combustion region 123. By spraying the fuel in the central region 123, it does not directly impinge on the spark plug electrodes but locates close to them for a better mixed state for ignition. In FIG. 11d, the squish flow vectors 2 are shown on the left side at the tip of spark plug 118 (representing the piston near TC) which help prevent fuel from settling on the spark plug end and clean the end; the fuel spray is shown on the right side (representing the piston position prior to ignition), being directed by the slight cup 133 in the piston up and to the right as a curved spray 132 moving towards the spark gap 125b to be ignited. This combination of flow, fuel spray, and ignition location and intensity (high energy), make for a practical system.

An advantage of the high energy ignition as used in this engine design is that it can sustain flows as high as 20 meters/second (n/s) without spark break-up and can deliver about 100 mJ of spark energy, which allows for very rapid ignition and rapid early flame propagation (which occurs in large part due to the high speed squish and turbulent colliding flows). This allows for ignition timing near TC even for lean and high EGR (or high internal exhaust residual) mixtures, which has several advantages including lower burn temperature and less time available for NOx formation, to minimize NOx emissions. Also, the more recessed exhaust valve 121b allows for more of the partially burnt gas formed at the piston ring regions 126 to be trapped in the combustion volume under the valves than to be exhausted because of the long travel path, allowing this partially burnt mixture to be reburned which minimizes hydrocarbon (HC) emissions. Also, the combination of rapid burn, the larger combustion volume under the exhaust valve 121b, and the large squish zones where the end gas (last part of the mixture to burn) is located and subjected to cooling by the reverse squish flow after TC, means that higher compression ratios can be used without engine knock for higher efficiency. Moreover, the flat or slightly cupped piston can be more readily coated with thermal barrier coatings (TBC) to minimize heat transfer, reduce HC, and increase engine efficiency.

Since certain changes may be made in the above combustion chamber designs, in the location and use of the ignition, and in the air-fuel mixture flows without departing from the scope of the invention herein disclosed, it is intended that all matter contained in the above description, or shown in the accompanying drawings, shall be interpreted in an illustrative and not limiting sense.

What is claimed is:

1. An internal combustion engine for igniting, combusting, and expanding an air-fuel mixture and producing work by means of a movable piston within a cylinder that has a cylinder head powered by the combustion-expansion, the engine employing a colliding-flow-coupled-spark-discharge process, CFCSD, comprising, in combination:

(a) a combustion chamber placed and shaped to form a combustion zone mainly within the cylinder head constructed and arranged to induce high air flow with intense turbulence as the piston moves near the cylinder head, (b) means defining a high energy ignition system with one or more spark plugs located at the edge of said combustion zone in the high air-flow regions generated therein by the engine piston motion as it nears the cylinder head on the compression stroke, (c) the system constructed and arranged such that as the piston approaches the cylinder head, one or more of the spark plugs are fired to produce sparks which are forced radially inwards by said piston induced air-flows towards the center of the combustion zone where there exists said intense turbulence by colliding flows, whereby a rapid combustion of the air-fuel mixture is established resulting in high engine efficiency and low emissions.

2. A CFCSD system as defined in claim 1 wherein the high air-flows are of the squish type produced by the piston surface, when near top center of the cylinder (TC), impinging on closely spaced cylinder head regions around said combustion zone.

3. An ignition system as defined in claim 1 wherein said combustion zone is located mainly under the exhaust valve means.

4. An ignition system as defined in claim 1 wherein said combustion zone is located mainly under two centrally located small adjacent valves, the intake and exhaust valve.

5. An ignition system as defined in claim 1 wherein said ignition system has flow resistant spark of peak current between 300 and 800 ma.

6. An ignition system as defined in claim 1 wherein two spark plugs are used at two opposite sides of the edge of the combustion zone where high air-flows are generated at the time of ignition firing.

7. An ignition system as defined in claim 1 further comprising fuel injection means for introducing fuel directly into the combustion chamber and more particularly essentially entirely within the combustion zone.

8. An ignition system as defined in claim 1 wherein the spark formed from said one or more spark plugs is formed between the center high voltage electrode of the spark plug and the piston surface when the piston is near TC.

9. An ignition system as defined in claim 4 wherein said combustion zone as projected onto the piston face is defined by arcs around and substantially paralleling the outer edges of the two valves and joined by essentially straight line barriers defining large squish lands on the two sides of said lines at whose inner edges one or two spark plugs are located to enable high inward radial squish flow to impinge on their sparks formed during ignition firing.

10. An ignition system as defined in claim 9 wherein one spark plug is located at the said edge of the combustion zone and a fuel injector is located at the opposite side of the combustion zone.

11. An ignition system as defined in claim 9 wherein a fuel injector is placed in the center of the combustion zone between the two ports of the valves.

12. An ignition system as defined in claim 9 wherein two spark plugs are used which form an angle of 15 to 45 degrees with the vertical with their spark gaps in a central portion of the squish flow to direct the sparks radially in and upwards.

13. An ignition system as defined in claim 1 wherein the exhaust valve is located essentially at the center of the combustion chamber with the combustion zone located mainly underneath it.

14. An ignition system as defined in claim 13 wherein two intake valves are located side-by-side between the exhaust valve and periphery of the combustion chamber.

15. An ignition system as defined in claim 13 wherein two intake valves are located on either side of the exhaust valve between it and the periphery of the combustion chamber.

16. An ignition system as defined in claim 13 wherein the side wall of the combustion zone wherein spark plugs are mountable makes an approximately 45° to the vertical.

17. An ignition system as defined in claim 1 wherein the combustion chamber is part of a Miller Cycle engine defined by a late intake valve closing and higher than normal expansion ratio.

18. An ignition system as defined in claim 4 wherein the combustion chamber is part of a Miller Cycle engine defined by a late intake valve closing and higher than normal expansion ratio.

19. An ignition system as defined in claim 4 wherein the combustion chamber is part of a cam type virtual three stroke engine defined by intake and compression stroke approximately ½ of the expansion stroke which has an expansion ratio of approximately 12 to one or greater.

20. An improved ignition-combustion system for internal combustion engines comprising:

(a) means defining a compact combustion chamber zone in the engine cylinder head mainly under the exhaust valve, (b) means for forming large air-squish zones formed at the edge of the combustion zone which produce colliding squish flows with high turbulence at the center of the combustion zone, (c) spark plug means located at the edge of the combustion zone within the high squish zones, the combination being constructed and operable to produce a complete ignition and combustion of colliding-flow-coupled-spark discharge (CFCSD), (d) the ignition employing high energy flow-resistant ignition sparks which move under the influence of the squish flow towards the central turbulence region as the piston nears engine top center, to produce rapid and complete burning of lean and high EGR mixtures, whereby best engine efficiency and lowest emissions are achieved.

* * * * *